United States Patent [19]
Graves et al.

[11] 3,885,001
[45] May 20, 1975

[54] MANUFACTURE OF THIOPEROXYDIPHOSPHATES

[75] Inventors: Donald Burrell Graves, Wadsworth; Otto William Maender, Akron, both of Ohio

[73] Assignee: Monsanto Company, St. Louis, Mo.

[22] Filed: Mar. 6, 1974

[21] Appl. No.: 448,470

[52] U.S. Cl.................................. 260/968; 260/926
[51] Int. Cl. ................................................. C07f 9/16
[58] Field of Search........................... 260/926, 968

[56] References Cited
UNITED STATES PATENTS

| | | | |
|---|---|---|---|
| 2,471,115 | 5/1949 | Mikeska........................ | 260/968 X |
| 2,631,132 | 3/1953 | McDermott.................... | 260/968 X |
| 2,983,644 | 5/1961 | Willard et al. ...................... | 260/926 |

Primary Examiner—Lorraine A. Weinberger
Assistant Examiner—Richard L. Raymond

[57] ABSTRACT

An improved method for preparing thioperoxydiphosphates by hypohalite oxidation is described which comprises adding acid and hypohalite to an aqueous solution of alkali metal salt of phosphorodithioic acid.

11 Claims, No Drawings

MANUFACTURE OF THIOPEROXYDIPHOSPHATES

MANUFACTURE OF THIOPEROXYDIPHOSPHATES

This application relates to processes for preparing thioperoxydiphosphates which processes were formerly classified in Patent Office Class 260-461 but which are now classified in Class 260, subclasses 920 to 990.

BACKGROUND OF THE INVENTION

Thioperoxydiphosphates are useful as additives for lubricating oils, insecticides, and in the vulcanization of rubber. They are prepared by oxidation of either phosphorodithioic acid or salt thereof with various oxidizing agents. Hydrogen peroxide is commonly used but it is a relatively expensive oxidizing agent. The use of more economical oxidizing agents such as halogens or alkali metal hypohalites has been unsatisfactory because of poor yields and low product quality. A method has now been found for preparing thioperoxydiphosphate via hypohalite oxidation which gives improved yields and product quality.

SUMMARY OF THE INVENTION

According to this invention, phosphorodithioic acid of the formula

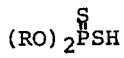

is converted to thioperoxydiphosphate of the formula

by adding to an aqueous solution of alkali metal salt of said phosphorodithioic acid at a pH of 6 or above, alkali metal hypohalite and a quantity, equivalent to the major portion of base generated from the hypohalite, of mineral acid or said phosphorodithioic acid.

In one embodiment of the invention, to a reactor charged with alkali metal salt of phosphorodithioic acid, (the reactor is generally charged by adding a quantity of aqueous sodium hydroxide solution followed by an equivalent amount of phosphorodithioic acid, pH of solution about 6–8) there is added a sufficient quantity of alkali metal hypohalite to oxidize all of the aforesaid salt to thioperoxydiphosphate. The pH of the reaction mixture is about 11.5–12. A quantity of mineral acid is then added sufficient to react with the major portion of the base generated from the hypohalite oxidation reaction and preferably sufficient to essentially neutralize the reaction mixture, pH of 8 or less. The thioperoxydiphosphate is separated from the reaction media and purified further, if desirable.

In another embodiment of the invention, to a reactor charged with aqueous alkali metal salt of phosphorodithioic acid at a pH between 6–12, there are added alternately or concurrently alkali metal hypohalite and mineral acid. The addition of hypohalite and acid are continued until essentially all of the alkali metal salt of the phosphorodithioic acid is converted to thioperoxydiphosphate. The stoichiometry of the reaction requires the consumption of one mole of hypohalite to convert two moles of alkali metal salt to one mole of thioperoxydiphosphate, sometimes as much as 1.5 moles of hypohalite, is consumed for each mole of product produced. By monitoring the pH of the solution, the point at which the oxidation is complete is readily determined. The base generated, as the hypohalite is consumed, is being continuously neutralized by the added acid. When the oxidation is complete, base is no longer generated and the pH begins dropping due to the presence of unreacted acid. The reaction is essentially complete at this time. Thus, the amount of acid added is sufficient to react with the major portion, if not all, of the base generated. The thioperoxydiphosphate is recovered by conventional procedures. Any mineral acid, for example, hydrochloric acid or sulfuric acid, is suitable.

In a preferred embodiment of the invention, to a reactor containing an aqueous solution of alkali metal salt of phosphorodithioic acid, there are added concurrently alkali metal hypohalite and phosphorodithioic acid in such manner to keep the pH within the range of 6–12 and preferably within the range of 7–10. An advantage of this embodiment is that the addition of reactants may continue indefinitely or until any given desired quantity of product is obtained since the initial charge of alkali metal salt of phosphorodithioic acid is not converted (or additional alkali metal salt of phosphorodithioic acid is being generated) so long as the pH is maintained within the indicated range.

The reaction mechanism is unknown but the result is as if the phosphorodithioic acid reacts directly with hypohalite and that the original alkali salt charge remains about the same. The reaction is illustrated by the equation

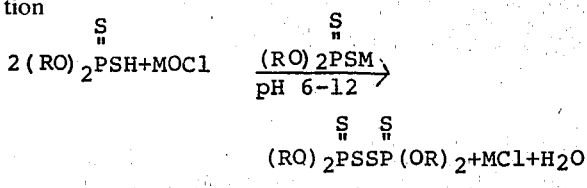

in which M is an alkali metal preferably sodium or potassium and R is alkyl, phenyl, cycloalkyl, lower alkyl substituted phenyl and phenyl substituted lower alkyl. Sometimes, depending upon the pH after the last phosphorodithioic acid addition, all of the alkali metal salt is converted to thioperoxydiphosphate. However, complete conversion is assured by adjusting the final pH to 8 or below by adding mineral acid. Another advantage of this embodiment of the invention is the reduced consumption of mineral acid.

As already indicated, the pH of the reaction media is important. If the pH falls below 6, both yield and product quality are reduced, however, the pH may rise as high as about 12. The acid and hypohalite may be added alternately while maintaining the pH at 6 or above by varying the additions in accordance with observed changes in pH. Preferably, the acid and hypohalite are added concurrently with minor corrections in the rate at which the reactants are added depending upon the direction in which pH is changing. One advantage of the process of the invention is that the proper stoichiometry of reactants is readily ascertained by monitoring the pH. A pH range of 7–10 is more preferred while addition of reactants is continuing and it is recommended that the final pH is 8 or below. However, if excess mineral acid is added at the end which causes the pH to drift below 6, acceptable product is recovered. The initial charge of alkali metal salt of the dithiophosphoric acid may vary over a wide range but control of pH is more difficult when the initial charge is small, consequently, a minimum charge of at least about 0.05 moles of said salt is recommended. The amount of phosphorodithioic acid subsequently added is variable but usually does not exceed 10 times the molar amount of alkali metal salt of said acid originally charged to the reactor.

The overall process is essentially a base catalyzed oxidation of a phosphorodithioic acid with hypohalite at a pH of 6 or above and is conveniently described in terms of process steps as the addition of hypohalite and acid to alkali metal salt of phosphorodithioic acid. A solution comprising water and alkali metal salt of the appropriate phosphorodithioic acid is satisfactory for carrying out the process of the invention. However, a preferred solution according to the invention comprises a mixed solvent of water and a polar organic solvent, such as an aliphatic alcohol, with mixtures of 40–60 percent of either component being preferred. An advantage of aqueous reaction media is that the alkali metal halide by-product is soluble in water which permits easy separation of the insoluble thioperoxydiphosphate product which is recovered by filtration or decantation depending whether the thioperoxydiphosphate is solid or liquid.

The reaction temperature may vary from the freezing point to the boiling point of the reaction media but preferably the temperature is between 0°–40°C with a temperature range of 5°–25°C being more preferred. Higher reaction temperatures decrease the yield slightly and increase the density of the product.

The radical designated by R in the formulas may be any cyclic or acyclic, aliphatic or aromatic radical preferably hydrocarbon. R may be alkyl, aryl, aralkyl, alkaryl and cycloalkyl. Branched and unbranched alkyl radicals of 1–20 carbon atoms are satisfactory with lower alkyl radicals, i.e., alkyl radicals of 1–5 carbon atoms, being a preferred subgroup. Aralkyl, alkyl radicals substituted by arene, are suitable with lower alkyl substituted by phenyl being a preferred subgroup. Cycloalkyl radicals of 5–8 carbon atoms are preferred. Phenyl is the preferred aryl radical. Alkaryl radicals, aryl radicals substituted by alkyl, are also satisfactory with lower alkyl substituted phenyl being a preferred subgroup.

Illustrative examples of R are methyl, ethyl, propyl, n-butyl, sec-butyl, tert-butyl, isobutyl, amyl, hexyl, heptyl, octyl, 2-ethylhexyl, decyl, dodecyl, eicosyl, benzyl, $\alpha$-methylbenzyl, $\alpha,\alpha$-dimethylbenzyl, xylyl, phenethyl, phenylpropyl, phenylbutyl, cyclopentyl, cyclohexyl, cyclooctyl, tolyl, ethylphenyl, cumenyl and butylphenyl.

DESCRIPTION OF PREFERRED EMBODIMENTS

To a reactor equipped with stirring means and temperature control means, there is charged 0.3 mole of sodium hydroxide and 0.3 mole of 0,0'-diisopropylphosphorodithioic acid to give 0.3 mole of sodium 0,0'-diisopropyldithiophosphate in 250 ml of 2-propanol and 250 ml of water, pH=7.5. To the stirred solution, sodium hypochlorite (14.1% aqueous solution) and hydrochloric acid (20% aqueous solution) in the amounts shown in Table I are simultaneously added dropwise at 10-15°C over a period of about one hour at a rate to maintain the pH within the indicated range. After the oxidation reaction is complete as indicated by deflection of the pH meter, the mixture is stirred for one hour. The 0,0'-diisopropyl thioperoxydiphosphate is recovered by filtration, washed twice with 200 ml portions of water and air-dried. The results of three experiments are listed in Table I. The data show that the product is recovered in high yields and purity.

TABLE I

| Moles | | | % Yield | Product | |
|---|---|---|---|---|---|
| NaOCl | HCl | pH | | m.p.°C | Assay, % |
| 0.237 | 0.217 | 6–10 | 95 | 87.5–88.5 | 97.0 |
| 0.218 | 0.219 | 8–10 | 100 | 86–88 | 95.4 |
| 0.245 | 0.219 | 8–10 | 97 | 85–87.5 | 95.2 |

To a suitable reactor, there is charged 0.134 moles of sodium hydroxide dissolved in 104 grams of 2-propanol and 104 grams of water. An amount of 0,0'-diisopropylphosphorodithioic acid is added equal to the molecular amount of sodium hydroxide charged giving a solution having a pH of about 11. Additional 0,0'-diisopropylphosphorodithioic acid (sufficient to give a total charge of 0.465 mole) is added at 10°–15°C simultaneously with a solution of 19.3% sodium hypochlorite. The reaction mixture is stirred while both reactants are added dropwise over a period of about two hours at a rate to control the pH in the range of 10–12. After all the 0,0'-diisopropylphosphorodithioic acid is charged, the addition of sodium hypochlorite is continued and the dropwise addition of 20% hydrochloric acid solution is begun. The additions of hypochlorite and hydrochloric acid are continued so long as the pH of the slurry increases with each increment of added hypochlorite. When the pH begins to drop, sodium hypochlorite addition is stopped and sufficient hydrochloric acid is added to adjust the final pH to 8 or below. The total quantity of hypochlorite added is 0.42 moles and the total quantity of hydrochloric acid added is 0.033 moles. The reaction mixture is stirred for one hour. The 0,0'-diisopropyl thioperoxydiphosphate is recovered by filtration, washed twice with 200 ml portions of water and air-dried. The 0,0'-diisopropyl thioperoxydiphosphate is obtained in 94% yield, m.p. 86.5°–90°C, 96.8%.

The experiments of Tables II, III and IV are carried out by the following procedure.

To a suitable reactor, there is charged a quantity of sodium hydroxide dissolved in 250 ml of 2-propanol and 250 ml of water. An amount of 0,0'-diisopropylphosphorodithioic acid is added equal to the molecular amount of sodium hydroxide charged giving a solution having a pH of about 8. Additional 0,0'-diisopropylphosphorodithioic acid (sufficient to give a total charge of 0.3 mole) is added concurrently with a solution of 18.5% sodium hypochlorite. The reaction mixture is stirred while both reactants are added dropwise over a period of about one hour at a rate to control the pH in the indicated range. After all the 0,0'-diisopropylphosphorodithioic acid is charged, the addition of sodium hypochlorite solution is continued so long as the pH of the slurry increases which increase indicates that sodium hydroxide is still being produced. If necessary, control of the pH of the slurry is maintained within the desired range by concurrent dropwise addition of 20% hydrochloric acid solution. When the pH begins dropping, sodium hypochlorite addition is stopped. The reaction mixture is stirred for one hour. The 0,0'-diisopropyl thioperoxydiphosphate is recovered by filtration, washed twice with 200 ml portions of water and air-dried.

The results of three experiments showing the effect of temperature are tabulated in Table II. The data indicate that lower temperatures improve the yield but it is noted that a more dense crystalline product is obtained at higher temperatures. Comparison of the results of Tables I and II show that the method employing phosphorodithioic acid addition gives essentially the same yield of product but with substantially reduced consumption of both sodium hydroxide and hydrochloric acid.

TABLE II

| Moles | | | | | Product | | |
|---|---|---|---|---|---|---|---|
| NaOCl | NaOH | HCl | Temp.°C | pH | % yield | m.p.°C | Assay,% |
| 0.258 | 0.10 | 0.039 | 20–25 | 7–9 | 94 | 87–89 | 96.5 |
| 0.244 | 0.10 | 0.055 | 10–15 | 7–9 | 96 | 87–89 | 95.6 |
| 0.218 | 0.10 | 0.063 | 0–5 | 7–9 | 99 | 87–88 | 96.5 |

A series of experiments in which the amount of sodium hydroxide is varied is shown in Table III. The data indicate that satisfactory yields and purity are achieved at lower caustic levels and that less mineral acid is consumed at the lower caustic levels.

TABLE III

| Moles | | | | | Product | | |
|---|---|---|---|---|---|---|---|
| NaOCl | NaOH | HCl | Temp.°C | pH | % yield | m.p.°C | Assay,% |
| 0.225 | 0.10 | 0.063 | 5–10 | 7–9 | 95 | 87–89 | 96.7 |
| 0.239 | 0.075 | 0.035 | 5–10 | 7–9 | 98 | 87–88.5 | 96.7 |
| 0.263 | 0.05 | 0.0 | 5–10 | 7–9 | 95 | 87–88 | 95.6 |

A study of the effect of solvent and pH range is shown in Table IV. The data indicate that the process is applicable to a solvent system of water alone or water-alcohol mixtures.

TABLE IV

| Moles | | | | | | Product | | |
|---|---|---|---|---|---|---|---|---|
| NaOCl | NaOH | HCl | Temp.°C | Solvent | pH | % yield | m.p.°C | Assay,% |
| 0.250 | 0.10 | 0.055 | 5–10 | 50/50 H$_2$O/methanol | 7–9 | 94 | 84–87 | 95.6 |
| 0.225 | 0.10 | 0.059 | 5–10 | 50/50 H$_2$O/2-propanol | 6–8 | 100 | 87–89 | 95.4 |
| 0.225 | 0.10 | 0.063 | 5–10 | 50/50 H$_2$O/2-propanol | 7–9 | 95 | 87–89 | 96.7 |
| 0.225 | 0.10 | 0.059 | 5–10 | 50/50 H$_2$O/2-propanol | 8–10 | 96 | 87–89 | 96.6 |
| 0.294 | 0.125 | 0.026 | 5–10 | H$_2$O | 6–8 | 91 | 82–87 | 97.7 |
| 0.335 | 0.125 | 0.0 | 5–10 | H$_2$O | 7–9 | 91 | 81–87 | 97.9 |
| 0.316 | 0.125 | 0.018 | 5–10 | H$_2$O | 8–10 | 98 | 83–87 | 97.7 |

Although the invention has been illustrated by typical examples, it is not limited thereto. Changes and modifications of the examples of the invention herein chosen for purposes of disclosure can be made which do not constitute departure from the spirit and scope of the invention.

The embodiment of the invention in which an exclusive property or privilege is claimed are defined as follows:

1. A process for converting phosphorodithioic acid of the formula $$(RO)_2 \overset{S}{\underset{\|}{P}} SH$$

to thioperoxydiphosphate of the formula

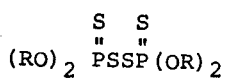

in which R is alkyl of 1–20 carbon atoms, phenyl substituted lower alkyl, cycloalkyl of 5–8 carbon atoms, phenyl, or lower alkyl substituted phenyl which comprises adding to an aqueous solution of alkali metal salt of said phosphorodithioic acid at a pH of 6 or above alkali metal hypohalite and a quantity, equivalent to the major portion of base generated from the hypohalite, of mineral acid or said phosphorodithioic acid.

2. The process of claim 1 in which the acid is added concurrently with the hypohalite.

3. The process of claim 2 in which at least about 0.05 moles of said alkali metal salt is present.

4. The process of claim 3 in which the acid is mineral acid.

5. The process of claim 3 in which the acid is phosphorodithioic acid.

6. The process of claim 5 in which hypohalite and acid are added to an aqueous-alcoholic solution between 0°–40°C.

7. The process of claim 6 which comprises controlling the addition of hypohalite and acid to maintain the pH between 7–10.

8. The process of claim 7 which comprises the additional step of adjusting the final pH by adding mineral acid.

9. The process of claim 7 in which the hypohalite is sodium hypohalite.

10. The process of claim 7 in which R is lower alkyl.

11. The process of claim 7 in which R is isopropyl.

* * * * *